United States Patent
Yamamoto

(10) Patent No.: US 11,462,781 B2
(45) Date of Patent: Oct. 4, 2022

(54) BATTERY STORAGE CASE

(71) Applicant: AISIN CORPORATION, Aichi (JP)

(72) Inventor: Michihiko Yamamoto, Kariya (JP)

(73) Assignee: AISIN CORPORATION, Kariya (JP)

(*) Notice: Subject to any disclaimer, the term of this patent is extended or adjusted under 35 U.S.C. 154(b) by 89 days.

(21) Appl. No.: 16/825,094

(22) Filed: Mar. 20, 2020

(65) Prior Publication Data

US 2020/0411927 A1 Dec. 31, 2020

(30) Foreign Application Priority Data

Jun. 25, 2019 (JP) .............................. JP2019-116898

(51) Int. Cl.
*H01M 10/6554* (2014.01)
*H01M 10/625* (2014.01)
*H01M 10/6556* (2014.01)
*H01M 10/052* (2010.01)

(52) U.S. Cl.
CPC ..... *H01M 10/6554* (2015.04); *H01M 10/052* (2013.01); *H01M 10/625* (2015.04); *H01M 10/6556* (2015.04)

(58) Field of Classification Search
CPC ........... H01M 10/6554; H01M 10/052; H01M 10/625; H01M 10/6556; H01M 10/613; H01M 10/653; H01M 10/6568; Y02E 60/10
See application file for complete search history.

(56) References Cited

U.S. PATENT DOCUMENTS

| | | | |
|---|---|---|---|
| 9,052,168 B1 | 6/2015 | Rawlinson | |
| 9,054,402 B1 | 6/2015 | Rawlinson | |
| 9,929,389 B2 | 3/2018 | Klimek et al. | |
| 2008/0268328 A1 | 10/2008 | Lee et al. | |
| 2012/0009455 A1* | 1/2012 | Yoon ................. | H01M 10/6555 429/120 |
| 2015/0194714 A1* | 7/2015 | You .................... | H01M 10/6569 429/120 |
| 2016/0093931 A1* | 3/2016 | Rawlinson ........ | H01M 10/6556 429/72 |

(Continued)

FOREIGN PATENT DOCUMENTS

| | | | | |
|---|---|---|---|---|
| CN | 1572913 A | * | 2/2005 | |
| CN | 202839778 U | * | 3/2013 | ............. Y02E 60/10 |
| CN | 104868200 A | * | 8/2015 | ................ F28F 1/22 |

(Continued)

*Primary Examiner* — Kaity V Chandler
(74) *Attorney, Agent, or Firm* — Oblon, McClelland, Maier & Neustadt, L.L.P.

(57) ABSTRACT

A battery storage case includes: a temperature adjustment plate having an upper wall portion on which a battery is mounted, a lower wall portion disposed below and spaced apart from the upper wall portion so as to face the upper wall portion, and a connection wall portion connecting the upper wall portion and the lower wall portion to each other, the temperature adjustment plate being integrally formed of an aluminum alloy; and an upper lid connected to the temperature adjustment plate so as to cover the battery mounted on the upper wall portion. The upper wall portion is formed with a flow path forming hole for forming a flow path through which a heat exchange medium for adjusting a temperature of the battery flows.

6 Claims, 6 Drawing Sheets

(56) References Cited

U.S. PATENT DOCUMENTS

2017/0271727 A1    9/2017    Ito et al.

FOREIGN PATENT DOCUMENTS

| CN | 205752459 U   |   | 11/2016 |     |            |
|----|---------------|---|---------|-----|------------|
| CN | 105244462 B   | * | 10/2017 | ... | Y02E 60/10 |
| CN | 109473746 A   | * | 3/2019  | ... | H01M 10/486 |
| JP | 5042096 B2    |   | 10/2012 |     |            |
| JP | 2012227164 A  | * | 11/2012 | ... | H01M 10/613 |
| JP | 5255817 B2    |   | 8/2013  |     |            |
| JP | 6360110 B2    |   | 7/2018  |     |            |
| JP | 6387422 B2    |   | 9/2018  |     |            |
| KR | 20130004141 A | * | 1/2013  | ... | H01M 10/6554 |

\* cited by examiner

BATTERY STORAGE CASE

CROSS REFERENCE TO RELATED APPLICATIONS

This application is based on and claims priority under 35 U.S.C. § 119 to Japanese Patent Application 2019-116898, filed on Jun. 25, 2019, the entire contents of which are incorporated herein by reference.

TECHNICAL FIELD

This disclosure relates to a battery storage case. In particular, this disclosure relates to a storage case for a lithium battery mounted in a vehicle.

BACKGROUND DISCUSSION

In recent years, the development of an electric vehicle (EV) (e.g., a plug-in hybrid vehicle (PHV) or a hybrid vehicle (HV)) driven by electric energy has been advanced and accordingly, the development of a battery which may be mounted in the electric vehicle has been accelerated. A lithium battery which is regarded as a promising battery to be mounted in the electric vehicle has a larger charge capacity than a lead battery, so that a reduction in the weight of a vehicle may be achieved by reducing the size of a battery and the cruising distance upon electric traveling (EV traveling) may be increased. For these reasons, it is anticipated that the lithium battery will be employed for most electric vehicle batteries.

The operating temperature range of the lithium battery is generally in the range of approximately −20° C. to 60° C. More specifically, the operating temperature range when charging the lithium battery (charge temperature range) is about 10° C. to about 45° C., and the operating temperature range when discharging the lithium battery (discharge temperature range) is about −20° C. to about 60° C. Further, since the lithium battery generates heat during charging and discharging, it is necessary to cool the lithium battery such that the temperature of the lithium battery falls within the operating temperature range during charging and discharging (charge temperature range or discharge temperature range). Further, even if an attempt is made to charge and discharge the lithium battery in winter, the outside air temperature may be lower than the lower limit of the above-mentioned operating temperature range. In this case, it is necessary to heat the lithium battery such that the temperature of the lithium battery falls within the above-mentioned operating temperature range. That is, when using the lithium battery, the temperature of the lithium battery needs to be adjusted so as to fall within the operating temperature range.

The lithium battery is generally mounted in a vehicle such that it is stored in a storage case. At this time, the temperature of the lithium battery is adjusted by heat exchange between a lower plate of the storage case and the lithium battery. Further, the storage case storing the lithium battery is disposed at the bottom of the vehicle. In this case, for example, when the vehicle is traveling on a rough road, a pressure may be applied to the bottom of the vehicle from below due to jumping of pebbles, and the storage case disposed at the bottom of the vehicle may be damaged. When the storage case is damaged, the lithium battery may be damaged accordingly. Further, a heat exchange medium (e.g., cooling water) used for adjusting the temperature of the lithium battery may leak into the storage case, and the lithium battery may be immersed in the leaked cooling water. When the cooling water infiltrates into the lithium battery, the lithium battery loses its function as a battery. Therefore, it is necessary to take measures to prevent the infiltration of cooling water into the lithium battery due to the leakage of the cooling water.

JP 6360110B (Reference 1) discloses a battery storage case including a division wall disposed below a battery module, a base plate disposed below and spaced apart from the division wall, and a cooling device for controlling the temperature of the battery module. The cooling device included in the storage case is provided in a cavity between the division wall and the base plate.

JP 5042096B (Reference 2) discloses a battery storage case including a cooling plate on which a battery block is mounted and a frame structure which fixes the cooling plate. According to this storage case, an air gap (heat insulation gap) is formed in a space between the cooling plate and the frame structure. Further, the cooling plate includes a top plate and a bottom plate which are vertically spaced apart from each other, and a closed chamber is defined by a space between the top plate and the bottom plate. A heat exchange pipe through which cooling water flows is disposed in the closed chamber.

According to the battery storage cases disclosed in Reference 1 and Reference 2, the bottom of a plate on which a battery is mounted is formed in a double bottom shape having an upper bottom wall and a lower bottom wall, the battery is mounted on the upper bottom wall, and a heat exchange pipe or a cooling device is disposed between the upper bottom wall and the lower bottom wall to adjust the temperature of the battery. Therefore, even if the lower bottom wall is damaged by a pressure applied from below while a vehicle is traveling, the battery mounted on the upper bottom wall is protected. Further, even if the heat exchange pipe disposed between the upper bottom wall and the lower bottom wall is damaged, the cooling water flowing out of the pipe will be stored between the upper bottom wall and the lower bottom wall, so that the cooling water does not infiltrate into the battery mounted on the upper bottom wall. Therefore, the occurrence of a problem due to the infiltration of water into the battery is prevented.

However, according to the storage cases disclosed in Reference 1 and Reference 2, a design structure for the provision of a double bottom shape is complicated. Further, since a double bottom structure is realized using a plurality of components, the manufacturing cost is high. Thus, a need exists for a battery storage case which is not susceptible to the drawback mentioned above.

SUMMARY

An aspect of this disclosure provides a battery storage case (1) including a temperature adjustment plate (10, 10A, 10B) having an upper wall portion (11) on which a battery (50) is mounted, a lower wall portion (12) disposed below and spaced apart from the upper wall portion so as to face the upper wall portion, and a connection wall portion (13) connecting the upper wall portion and the lower wall portion to each other, the temperature adjustment plate being integrally formed of an aluminum alloy, and an upper lid (30) connected to the temperature adjustment plate so as to cover the battery mounted on the upper wall portion, in which the upper wall portion is formed with a flow path forming hole (114) for forming a flow path through which a heat exchange medium for adjusting a temperature of the battery flows.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, a battery storage case according to the embodiments disclosed here will be described with reference to the drawings.

First Embodiment

Figure 1:
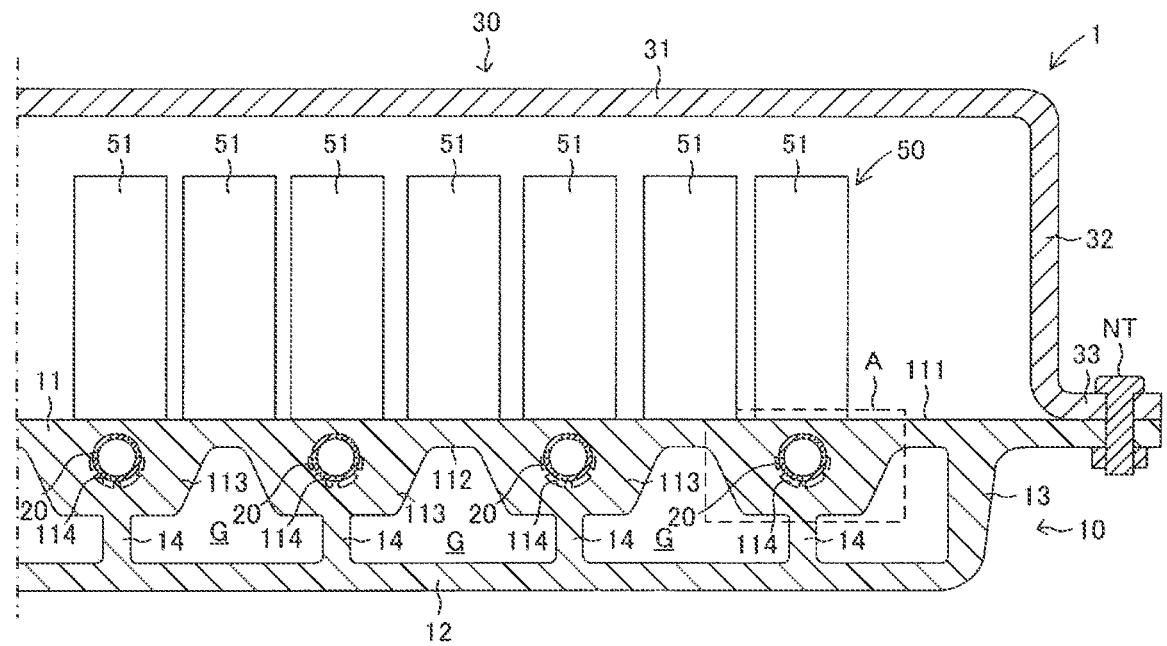
FIG. 1 is a schematic cross-sectional view partially illustrating an example of a battery storage case according to a first embodiment.

FIG. 1 is a schematic cross-sectional view partially illustrating an example of a battery storage case 1 according to a first embodiment. As illustrated in FIG. 1, the storage case 1 includes a temperature adjustment plate 10, a plurality of metal pipes 20, and an upper lid 30.

Figure 2:
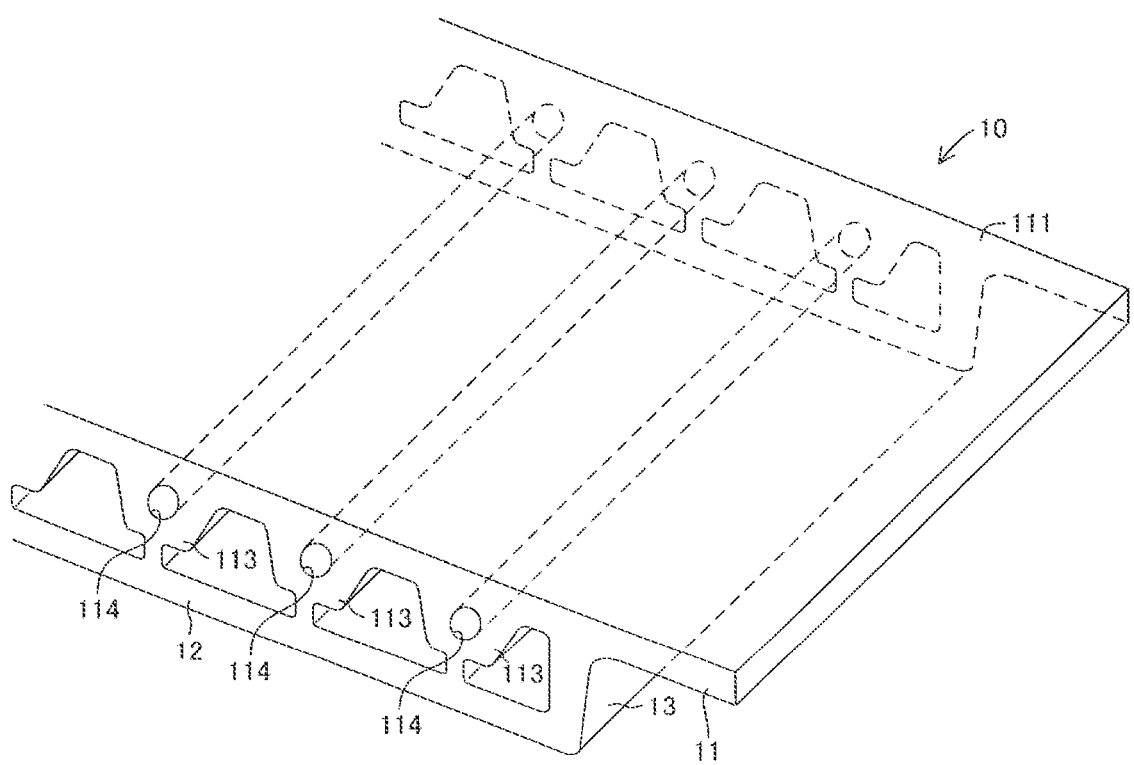
FIG. 2 is a schematic perspective view of a portion of a temperature adjustment plate.

The temperature adjustment plate 10 is a plate-shaped member which constitutes a bottom portion of the storage case 1. FIG. 2 is a schematic perspective view of a portion of the temperature adjustment plate 10. As illustrated in FIGS. 1 and 2, the temperature adjustment plate 10 is formed in a plate shape, and is substantially rectangular in a plan view. Further, as can be seen from FIGS. 1 and 2, the temperature adjustment plate 10 includes an upper wall portion 11, a lower wall portion 12 disposed below and spaced apart from the upper wall portion 11 so as to face the upper wall portion 11, and a connection wall portion 13 provided upright from an end of the lower wall portion 12 and having an upper end connected to the upper wall portion 11. The connection wall portion 13 connects the upper wall portion 11 and the lower wall portion 12 to each other.

An air gap G is formed between the upper wall portion 11 and the lower wall portion 12. This air gap G functions as a heat insulation space. Since the air gap G functions as a heat insulation space, the heat of a heat exchange medium flowing in a flow path forming hole 114 to be described later may be effectively prevented from escaping downward.

Further, the upper wall portion 11 has a mounting surface 111 facing upward and a lower surface 112 on the opposite side, and a lithium battery 50 is mounted on the mounting surface 111 of the upper wall portion 11 as illustrated in FIG. 1.

From the lower surface 112 of the upper wall portion 11, a plurality of protruding portions 113 protrude downward. The protruding portions 113 extend along one direction perpendicular to the thickness direction of the upper wall portion 11. Here, the thickness direction of the upper wall portion 11 is the direction from the mounting surface 111 to the lower surface 112 of the upper wall portion 11 (or the direction opposite thereto). That is, the thickness direction is the vertical direction in FIG. 1. In FIG. 1, the plurality of protruding portions 113 extend in parallel along the direction perpendicular to the paper surface. Each of the protruding portions 113 has the flow path forming hole 114 through which the heat exchange medium flows. The flow path forming hole 114 is formed along the direction in which the protruding portion 113 extends, and both ends thereof are open at both side ends of the upper wall portion 11. Therefore, the flow path forming hole 114 is formed so as to penetrate the upper wall portion 11 along the direction perpendicular to the thickness direction of the upper wall portion 11. Further, the thickness direction is the direction perpendicular to the mounting surface 111 of the upper wall portion 11. Thus, the flow path forming hole 114 is formed in the upper wall portion 11 so as to penetrate the upper wall portion 11 along the direction parallel to the mounting surface 111.

The temperature adjustment plate 10 is formed of an aluminum alloy. In the present embodiment, the temperature adjustment plate 10 is formed of a 6000 series or 7000 series aluminum alloy having a high strength. Further, the temperature adjustment plate 10 has a constant cross-sectional shape along the direction perpendicular to the paper surface of FIG. 1. Thus, the temperature adjustment plate 10 may be integrally formed by extrusion molding or die casting of an aluminum alloy.

The lithium battery 50 mounted on the mounting surface 111 of the upper wall portion 11 is configured by a cell stack in which a plurality of cells 51 are stacked. Each cell 51 constituting the cell stack is formed in a thin plate shape having a thickness in the transverse direction in FIG. 1 and is stacked in the thickness direction (transverse direction). Further, the stacking direction of each cell 51 is the direction orthogonal to the axial direction of the flow path forming hole 114.

Each of the plurality of cells 51 is provided with a positive electrode tab terminal and a negative electrode tab terminal which are not illustrated. The positive electrode tab terminals of the respective cells 51 are electrically connected to each other to form a plus terminal, and the negative electrode tab terminals of the respective cells 51 are electrically connected to each other to form a minus terminal. The plus terminal and the minus terminal are connected to an external power load (e.g., a motor) via an inverter and the like.

The upper lid 30 is configured to cover the lithium battery 50 mounted on the upper wall portion 11 of the temperature adjustment plate 10. The upper lid 30 includes an upper plate 31 which covers the upper surface of the lithium battery 50, a side plate 32 which extends so as to hang down from an end of the upper plate 31, and a flange 33 which extends horizontally from a lower end of the side plate 32. The flange 33 is surface-matched to a right end portion in FIG. 1 of the upper wall portion 11 of the temperature adjustment plate 10 from above. The flange 33 and the right end portion of the upper wall portion 11 which are surface-matched each other are fastened by a fastening member NT. Thus, the upper lid 30 is connected to the temperature adjustment plate 10 so as to cover the lithium battery 50 mounted on the upper wall portion 11, and the upper lid 30 and the upper wall portion 11 of the temperature adjustment plate 10 form a storage space for storing the lithium battery 50. The upper lid 30 is formed of, for example, iron, a resin, or an aluminum alloy.

Figure 3:
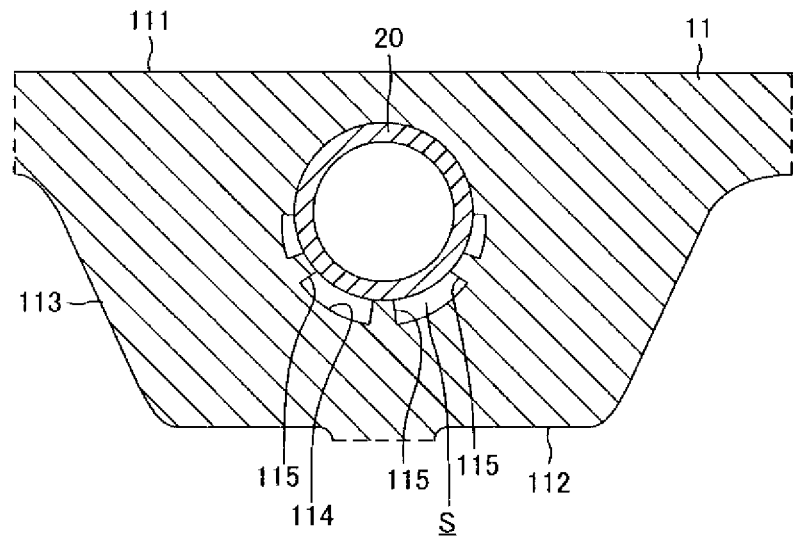
FIG. 3 is an enlarged view of a portion A of FIG. 1.

FIG. 3 is an enlarged view of a portion A of FIG. 1 and illustrates details of the protruding portion 113 formed on the upper wall portion 11 of the temperature adjustment plate 10 and the flow path forming hole 114 formed in the protruding portion 113. As illustrated in FIG. 3, a plurality of protrusions 115 are formed on the inner peripheral surface (inner wall surface) of the flow path forming hole 114 formed in the protruding portion 113. FIG. 3 illustrates an example in which three protrusions 115 are formed on the inner peripheral surface of the flow path forming hole 114, but the number of protrusions 115 is arbitrary. The protrusions 115 extend along the axial direction of the flow path forming hole 114.

Further, the plurality of protrusions 115 are spaced apart from each other in the circumferential direction of the flow path forming hole 114, and all of them are formed in a lower region of the inner peripheral surface of the flow path forming hole 114 when viewed in the direction illustrated in FIG. 3, i.e., in the axial direction of the flow path forming hole 114. Here, the "lower region" is a region that is located below a plane (horizontal plane) that is orthogonal to the thickness direction of the upper wall portion 11 and passes through the central axis of a metal pipe 20 to be described later which is inserted into the flow path forming hole 114. Then, the metal pipe 20 is inserted into the flow path forming hole 114 so as to be mounted on the plurality of protrusions 115. At this time, the metal pipe 20 is inserted into the flow path forming hole 114 such that the outer peripheral surface thereof is pressed against the tip ends of the protrusions 115. By pressing the metal pipe 20 against the protrusions 115 in this manner, the metal pipe 20 may be fixed in the flow path forming hole 114.

Figures 4A, 4B:
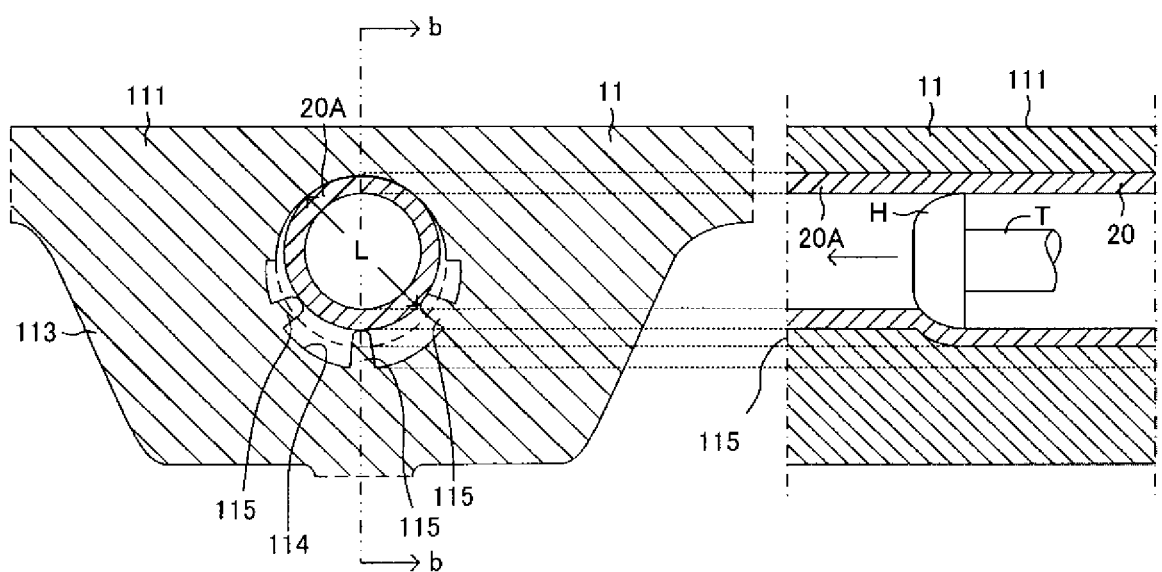
FIGS. 4A and 4B are views illustrating a method of fixing a metal pipe to a flow path forming hole.

FIGS. 4A and 4B are views illustrating an example of a method of fixing the metal pipe 20 to the flow path forming hole 114. In order to fix the metal pipe 20 to the flow path forming hole 114, first, a raw pipe of the metal pipe 20 is inserted into the flow path forming hole 114. FIG. 4A is a cross-sectional view of a state where a raw pipe 20A of the metal pipe 20 is inserted into the flow path forming hole 114 when viewed in the axial direction of the flow path forming hole 114. As can be seen by comparing FIG. 4A with FIG. 3, the outer diameter of the raw pipe 20A is smaller than the outer diameter of the metal pipe 20 fixed to the flow path forming hole 114 illustrated in FIG. 3. Specifically, the outer diameter of the raw pipe 20A is approximately equal to or slightly smaller than the diameter L of the circle that passes through the tip ends of the plurality of protrusions 115 formed on the inner peripheral surface of the flow path forming hole 114 and the top of the flow path forming hole 114 before the metal pipe 20 is inserted. That is, the outer diameter of the raw pipe 20A is a size that allows the raw pipe 20A to be inserted into the flow path forming hole 114 without interfering with the protrusions 115 before being pressed against the metal pipe 20.

After the raw pipe 20A is inserted into the flow path forming hole 114, the raw pipe 20A is expanded in diameter in the flow path forming hole 114 using a diameter expanding jig. FIG. 4B is a cross-sectional view illustrating a state where the raw pipe 20A is expanded in diameter by the diameter expanding jig. FIG. 4B illustrates a cross section of the upper wall portion 11 and the raw pipe 20A taken along line b-b in FIG. 4A. As illustrated in FIG. 4B, a diameter expanding jig T is inserted into the inside of the raw pipe 20A. A head H which has the maximum outer diameter larger than the inner diameter of the raw pipe 20A and smaller than the inner diameter of the flow path forming hole 114 is formed at the tip end of the diameter-expanding jig T. Thus, by pushing the head H of the diameter expanding jig T into the raw pipe 20A along the axis direction of the raw pipe 20A, the raw pipe 20A is expanded in diameter, and the tip ends of the protrusions 115 formed on the inner peripheral surface of the flow path forming hole 114 are crushed according to the diameter expansion of the raw pipe 20A. Therefore, after inserting the diameter expanding jig T from one end to the other end of the raw pipe 20A, the raw pipe 20A is expanded in diameter, so that the metal pipe 20 illustrated in FIG. 3 is inserted into the flow path forming hole 114 and the outer peripheral surface of the metal pipe 20 is pressed against the protrusions 115 having the crushed tip ends. In this way, the metal pipe 20 is fixed to the flow path forming hole 114.

When the metal pipe 20 is fixed to the flow path forming hole 114 as described above, as illustrated in FIG. 3, the metal pipe 20 is pressed against the protrusions 115 formed on the lower region of the inner peripheral surface of the flow path forming hole 114, and a gap S is formed between the metal pipe 20 and the lower region of the inner peripheral surface of the flow path forming hole 114. Meanwhile, an upper portion of the outer peripheral surface of the metal pipe 20 is pressed against an upper portion of the inner peripheral surface of the flow path forming hole 114 by a pressing contact force acting between the metal pipe 20 and the protrusions 115. Thus, the outer peripheral surface of the metal pipe 20 is brought into contact with the upper region of the inner peripheral surface of the flow path forming hole 114 over a wide range. Here, the "upper region" is a region that is located above a plane (horizontal plane) that passes through the central axis of the metal pipe 20 inserted into the flow path forming hole 114 and is orthogonal to the thickness direction of the upper wall portion 11.

Figure 5:
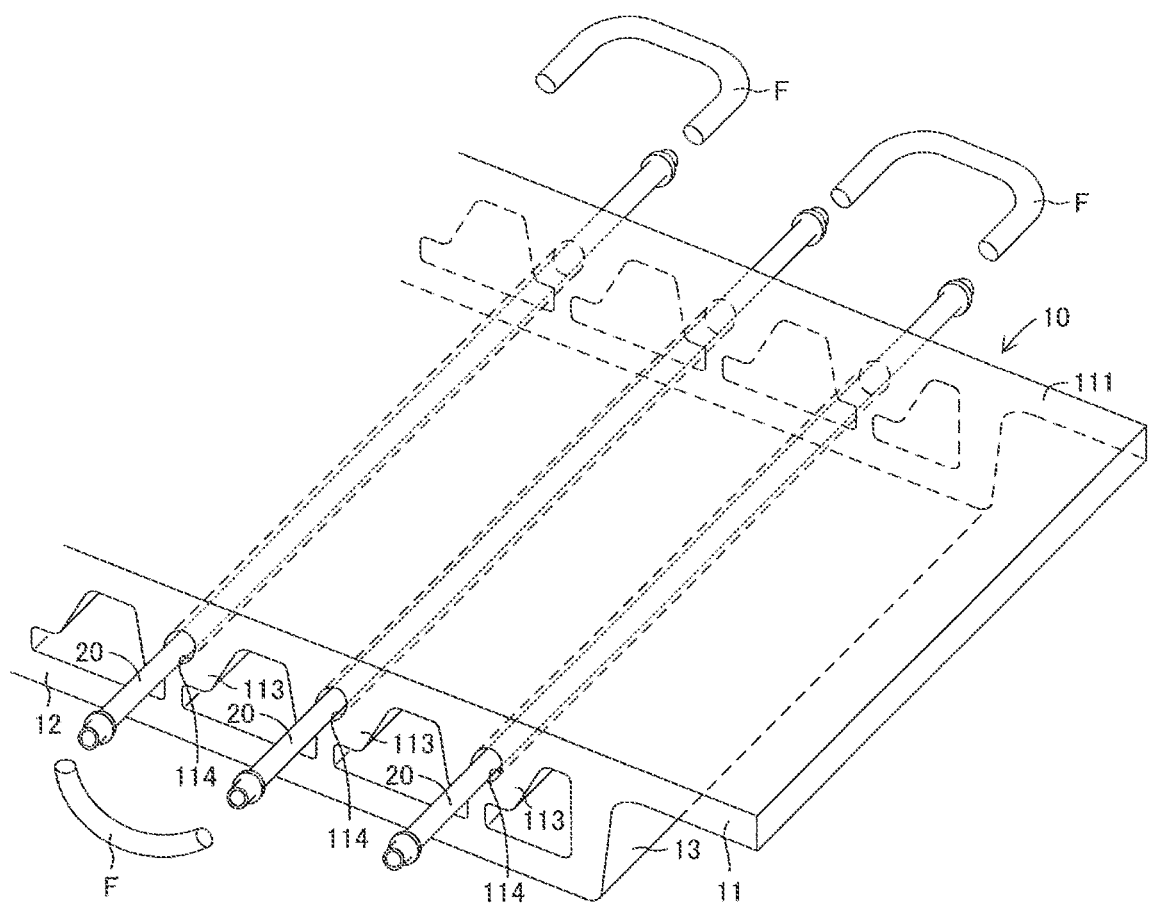
FIG. 5 is a schematic perspective view of the temperature adjustment plate in which the metal pipe is inserted into the flow path forming hole.

Further, the length of the raw pipe 20A is larger than the length of the flow path forming hole 114. Thus, when the metal pipe 20 is fixed to the flow path forming hole 114 as described above, both ends of the metal pipe 20 project from both side surfaces of the temperature adjustment plate 10. FIG. 5 is a schematic perspective view of a portion of the temperature adjustment plate 10 in which the metal pipe 20 is inserted into the flow path forming hole 114. As illustrated in FIG. 5, the metal pipe 20 is inserted into the flow path forming hole 114, and both ends of the metal pipe 20 protrude from both side surfaces of the temperature adjustment plate 10. Both ends of the protruding metal pipe 20 are beaded. Thus, both ends of the metal pipe 20 are expanded in diameter. Then, for example, ends of the adjacent metal pipes 20 and 20 are connected to each other by a flexible pipe, for example, a flexible hose F. Thus, the internal spaces of the adjacent metal pipes 20 communicate with each other via the flexible hose F.

The heat exchange medium flows in the metal pipe 20 inserted into the flow path forming hole 114. The heat exchange medium is typically cooling water, but a refrigerant (e.g., R134a) capable of performing heat exchange using heat of vaporization and heat of condensation may flow into the metal pipe 20.

The metal pipe 20 may be formed of, for example, an aluminum alloy, copper, or plated iron. Among them, an aluminum alloy or copper may be preferably used as the material of the metal pipe 20. In the present embodiment, a 3000 series aluminum alloy having high corrosion resistance is employed as the material of the metal pipe 20.

When the lithium battery 50 disposed in the storage case 1 having the above configuration is charged and discharged, the lithium battery 50 generates heat. Since the operating temperature range is set for the lithium battery 50 as described above, a low temperature heat exchange medium, for example, cooling water flows in the metal pipe 20 inserted into the flow path forming hole 114 such that the lithium battery 50 is prevented from being increased to a temperature higher than the operating temperature range due to heat generation. Thus, the heat of the lithium battery is transferred from the temperature adjustment plate 10 to the cooling water in the metal pipe 20, so that the lithium battery 50 is cooled.

Further, when the outside air temperature is less than the operating temperature range of the lithium battery 50, the lithium battery 50 may not be operated. In this case, a high temperature heat exchange medium, for example, heated cooling water flows in the metal pipe 20 inserted into the flow path forming hole 114 such that the temperature of the lithium battery 50 falls within the operating temperature range. Thus, the heat of the heat exchange medium is transferred to the lithium battery 50 via the metal pipe 20 and the temperature adjustment plate 10, and the lithium battery 50 is heated.

In order to quickly bring the temperature of the lithium battery 50 into the operating temperature range, it is necessary to efficiently transfer the heat or cold of the heat exchange medium to the lithium battery 50. In this regard, according to the present embodiment, the flow path forming hole 114 is formed in the upper wall portion 11 on which the lithium battery 50 is mounted, and the metal pipe 20 in which the heat exchange medium flows is inserted into the flow path forming hole 114. Therefore, the distance between the metal pipe 20 and the lithium battery 50 may be reduced as much as possible. Accordingly, the heat of the cooling water may be efficiently transferred to the lithium battery 50.

As described above, according to the present embodiment, the temperature adjustment plate 10 includes the upper wall portion 11 and the lower wall portion 12. The lower wall portion 12 is spaced apart from the upper wall portion 11 in the vertical direction. The upper wall portion 11 and the lower wall portion 12 realize a double bottom structure of the storage case 1. Then, the lithium battery 50 is mounted on the upper wall portion 11, and the flow path forming hole 114 through which the heat exchange medium flows is formed in the upper wall portion 11. Accordingly, even when the lower wall portion 12 of the temperature adjustment plate 10 is damaged by an impact such as a pressure applied to the storage case 1 from below in a state where the storage case 1 is placed on the bottom of the vehicle, the lithium battery 50 and a flow path through which the heat exchange medium flows are not provided between the upper wall portion 11 and the lower wall portion 12, so that the lithium battery 50 is protected and the leakage of the heat exchange medium is effectively prevented. Further, by forming the temperature adjustment plate 10 of an aluminum alloy, the weight of the storage case 1 may be reduced.

Further, according to the present embodiment, the metal pipe 20 is inserted into the flow path forming hole 114 formed in the upper wall portion 11 of the temperature adjustment plate 10, and the heat exchange medium flows in the metal pipe 20. Therefore, even if not only the lower wall portion 12 but also the upper wall portion 11 of the temperature adjustment plate 10 are damaged by, for example, a pressure applied from below, the heat exchange medium in the metal pipe 20 does not leak as long as the metal pipe 20 is not damaged. Furthermore, even if the metal pipe 20 is damaged and the heat exchange medium leaks out of the metal pipe 20, the leaked heat exchange medium is collected in the air gap G between the upper wall portion 11 and the lower wall portion 12. Since the air gap G is a space different from the storage space in which the lithium battery 50 is stored, i.e., the space above the upper wall portion 11, the leaked heat exchange medium does not infiltrate into the lithium battery 50. Therefore, it is possible to effectively prevent the occurrence of a problem due to the infiltration of water into the lithium battery 50.

Further, according to the present embodiment, as well illustrated in FIG. 3, the metal pipe 20 is fixed to the flow passage forming hole 114 in a state where the metal pipe is pressed against the protrusions 115 formed in the lower region of the inner peripheral surface of the flow path forming hole 114 and is in contact with the upper region of the inner peripheral surface of the flow path forming hole 114. According to this, the upper portion of the outer peripheral surface of the metal pipe 20 is brought into contact with the upper region of the inner peripheral surface of the flow path forming hole 114 over a wide range due to the pressing contact force between the metal pipe 20 and the protrusions 115. In this manner, the contact area between the upper portion of the metal pipe 20 and the upper region of the flow path forming hole 114 is larger than the contact area of the lower portion of the metal pipe 20 and the lower region of the flow path forming hole 114, so that the heat of the heat exchange medium flowing in the metal pipe 20 may be efficiently transferred to the lithium battery 50 mounted on the upper wall portion 11 above the metal pipe 20. Furthermore, the gap S exists between the lower portion of the metal pipe 20 and the lower region of the flow path forming hole 114, and the air gap G exists between the upper wall portion 11 and the lower wall portion 12. Since the gap S and the air gap G function as a heat insulation space, the heat of the heat exchange medium in the metal pipe 20 is effectively prevented from escaping downward. Thus, the heat of the heat exchange medium is mainly directed to the lithium battery 50 mounted above the upper wall portion 11. Accordingly, the lithium battery 50 may be more efficiently cooled or heated.

Further, since the metal pipe 20 formed of an aluminum alloy is fixed by being pressed against the protrusions 115 in the flow path forming hole 114 of the temperature adjustment plate 10 formed of the aluminum alloy, welding is not required for fixing the metal pipe 20. Normally, welding between aluminum alloys is technically difficult, and welding defects are likely to occur. Meanwhile, according to the present embodiment, since the metal pipe 20 may be provided in the temperature adjustment plate 10 without welding as described above, the occurrence of the welding defects described above may be prevented.

Furthermore, according to the present embodiment, as can be clearly understood from FIG. 1, reinforcing ribs 14 extend upward from the upper surface of the lower wall portion 12 of the temperature adjustment plate 10, and the upper ends of the reinforcing ribs 14 are connected to the upper wall portion 11. The reinforcing ribs 14 may improve the strength of the temperature adjustment plate 10, thus preventing the temperature adjustment plate 10 from being deformed. The upper ends of the reinforcing ribs 14 are connected to the protruding portions 113 formed on the upper wall portion 11 in FIG. 1, but may be connected to a portion where the protruding portions 113 are not formed. Further, the reinforcing ribs 14 may be configured so as to be deformed while absorbing an impact force when an impact is applied to the temperature adjustment plate 10 from the lower wall portion 12 side. According to this, the reinforcing ribs 14 are deformed while absorbing the impact force, thereby attenuating the impact force to be transmitted to the upper wall portion 11, so that the upper wall portion 11 and the metal pipe 20 inside the upper wall portion 11 may be protected.

Further, according to the present embodiment, as described above, since the upper wall portion 11 and the lower wall portion 12 of the temperature adjustment plate 10 may be integrally formed by extrusion molding or die-casting of an aluminum alloy, the manufacturing cost is lower as compared with a case where the upper wall portion 11 and the lower wall portion 12 are formed of separate members and assembled to form a double bottom structure. That is, according to the present embodiment, a storage case having a double bottom structure which may effectively prevent the infiltration of water into the lithium battery 50 may be manufactured at lower costs.

Further, both ends of the metal pipe 20 provided in the temperature adjustment plate 10 protrude from the temperature adjustment plate 10 and are beaded. Therefore, as illustrated in FIG. 5, a flexible pipe, for example, the flexible hose F may be used to connect, for example, the adjacent metal pipes 20, 20 to each other. By connecting the plurality of metal pipes 20 in this manner, a predetermined heat exchange circuit may be formed in the temperature adjustment plate 10 without welding the metal pipes 20 formed of an aluminum alloy. In addition, when the metal pipes 20 are formed of copper, the metal pipes may be bonded together by brazing.

Figure 6:
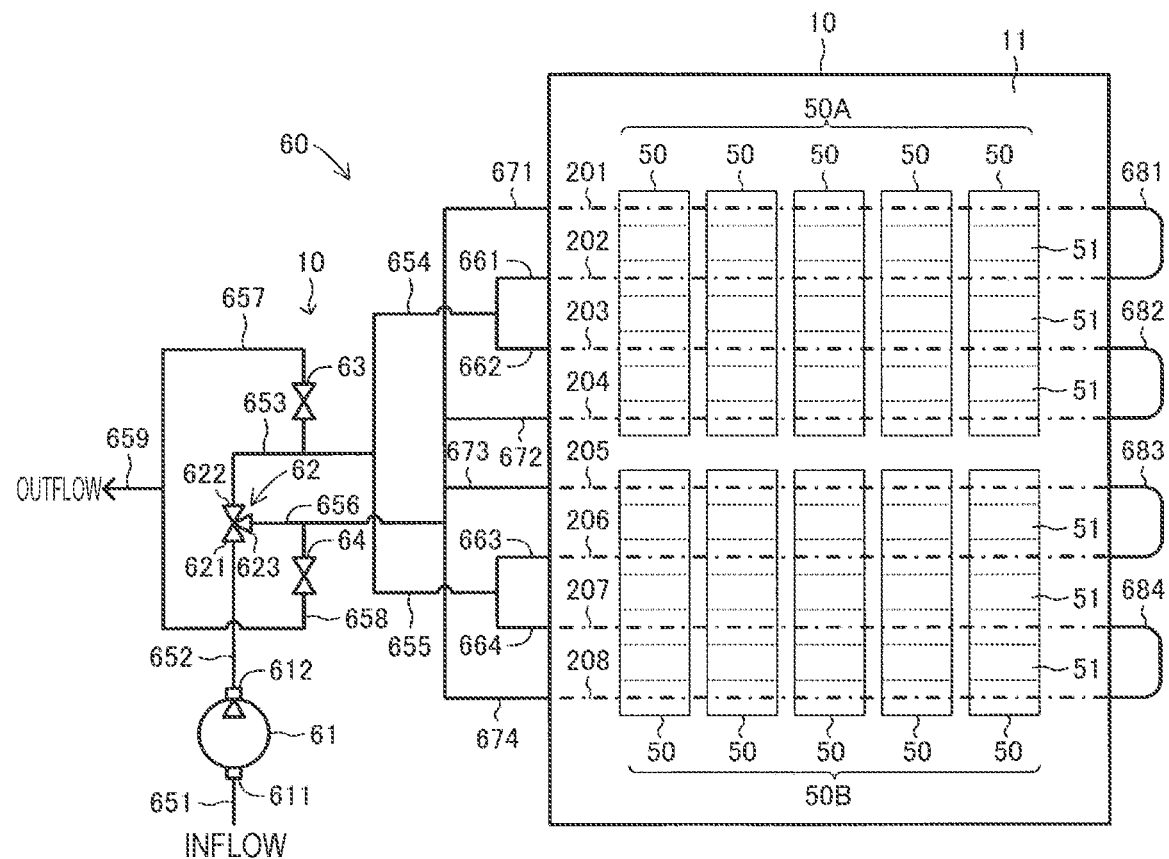
FIG. 6 is a view illustrating a configuration example of a heat exchange circuit using a plurality of metal pipes provided in the temperature adjustment plate.

FIG. 6 is a diagram illustrating a configuration example of a heat exchange circuit using the plurality of metal pipes 20 provided in the temperature adjustment plate 10. As illustrated in FIG. 6, the heat exchange circuit 60 includes a pump 61, a three-way valve 62, a first on-off valve 63, a second on-off valve 64, a plurality of connection pipes, and the plurality of metal pipes 20 provided in the temperature adjustment plate 10.

Further, in the example illustrated in FIG. 6, the temperature adjustment plate 10 is illustrated in a plan view, and a plurality of lithium batteries 50 are mounted on the upper wall portion 11 of the temperature adjustment plate 10. The plurality of lithium batteries 50 mounted on the upper wall portion 11 are separately divided into a first battery unit 50A and a second battery unit 50B, and each of the battery units includes a plurality of (five in FIG. 6) lithium batteries 50. Further, the plurality of lithium batteries 50 constituting each battery unit are arranged along the transverse direction in FIG. 6. Then, each of the plurality of lithium batteries 50 arranged in the transverse direction in FIG. 6 includes the plurality of cells 51 stacked in the vertical direction in FIG. 6.

Further, in the example illustrated in FIG. 6, the number of metal pipes 20 provided in the temperature adjustment plate 10 is eight. These metal pipes 20 are illustrated by one-dot dashed lines in FIG. 6. For convenience of description, these metal pipes 20 are referred to as a first metal pipe 201, a second metal pipe 202, a third metal pipe 203, a fourth metal pipe 204, a fifth metal pipe 205, a six metal pipe 206, a seventh metal pipe 207, and an eighth metal pipe 208 in this sequence from above in FIG. 6.

The respective metal pipes 201 to 208 are provided in parallel. Further, the first metal pipe 201 to the fourth metal pipe 204 are provided below a portion where the first battery unit 50A is mounted, and the fifth metal pipe 205 to the eighth metal pipe 208 are provided below a portion where the second battery unit 50B is mounted. Further, the lithium batteries 50 are arranged such that the arrangement direction of the plurality of lithium batteries 50 constituting the first battery unit 50A and the arrangement direction of the plurality of lithium batteries 50 constituting the second battery unit 50B are set so as to match the axial direction of each metal pipe.

Further, the first metal pipe 201 and the fourth metal pipe 204 are provided below a portion where either end portion (outer portion) in the stacking direction of the cells 51 (vertical direction in FIG. 6) of the mounting position of each lithium battery 50 constituting the first battery unit 50A is located. The second metal pipe 202 and the third metal pipe 203 are provided below a portion where the vicinity of a central portion in the stacking direction of the cells 51 of the mounting position of each lithium battery 50 constituting the first battery unit 50A is located. Thus, as the heat exchange medium flows in the first metal pipe 201 and the fourth metal pipe 204, the temperature of the outer portion of each lithium battery 50 in the first battery unit 50A is mainly adjusted, and as the heat exchange medium flows in the second metal pipe 202 and the third metal pipe 203, the temperature of the central portion of each lithium battery 50 in the first battery unit 50A is mainly adjusted.

Further, the fifth metal pipe 205 and the eighth metal pipe 208 are provided below a portion where either end portion (outer portion) in the stacking direction of the cells 51 of the mounting position of each lithium battery 50 constituting the second battery unit 50B is located. The sixth metal pipe 206 and the seventh metal pipe 207 are provided below a portion where the vicinity of a central portion in the stacking direction of the cells 51 of the mounting position of each lithium battery 50 constituting the second battery unit 50B is located. Thus, as the heat exchange medium flows in the fifth metal pipe 205 and the eighth metal pipe 208, the temperature of the outer portion of each lithium battery 50 in the second battery unit 50B is mainly adjusted, and as the heat exchange medium flows in the sixth metal pipe 206 and the seventh metal pipe 207, the temperature of the central portion of each lithium battery 50 in the second battery unit 50B is mainly adjusted.

The pump 61 has a suction port 611 and an ejection port 612, sucks the heat exchange medium from the suction port 611, and sends the sucked heat exchange medium from the ejection port 612 under pressure. Further, an inflow connection pipe 651 is connected to the suction port 611 of the pump 61, and one end of an ejection connection pipe 652 is connected to the ejection port 612 of the pump 61.

The three-way valve 62 is connected to the other end of the ejection connection pipe 652. The three-way valve 62 has a first port 621, a second port 622, and a third port 623, and is configured to selectively perform switching between communication of the first port 621 and the second port 622 and communication of the first port 621 and the third port 623. The other end of the ejection connection pipe 652 is connected to the first port 621 of the three-way valve 62.

One end of an inner connection pipe 653 is connected to the second port 622 of the three-way valve 62. Two inner branch connection pipes 654 and 655 branch from the other end of the inner connection pipe 653. One of the branched inner branch connection pipes 654 is further branched into a first inner connection pipe 661 and a second inner connection pipe 662, and the other branched inner branch connection pipe 655 is further branched into a third inner connection pipe 663 and a fourth inner connection pipe 664. Then, the first inner connection pipe 661 is connected to one end of the second metal pipe 202, the second inner connection pipe 662 is connected to one end of the third metal pipe 203, the third inner connection pipe 663 is connected to one end of the sixth metal pipe 206, and the fourth inner connection pipe 664 is connected to one end of the seventh metal pipe 207.

One end of an outer connection pipe 656 is connected to the third port 623 of the three-way valve 62. Four connection pipes (a first outer connection pipe 671, a second outer connection pipe 672, a third outer connection pipe 673, and a fourth outer connection pipe 674) branch from the other end of the outer connection pipe 656. Then, the first outer connection pipe 671 is connected to one end of the first metal pipe 201, the second outer connection pipe 672 is connected to one end of the fourth metal pipe 204, the third outer connection pipe 673 is connected to one end of the fifth metal pipe 205, and the fourth outer connection pipe 674 is connected to one end of the eighth metal pipe 208.

Further, the other end of the first metal pipe 201 and the other end of the second metal pipe 202 are connected via a first pipe connection pipe 681, the other end of the third metal pipe 203 and the other end of the fourth metal pipe 204 are connected via a second pipe connection pipe 682, the other end of the fifth metal pipe 205 and the other end of the sixth metal pipe 206 are connected via a third pipe connection pipe 683, and the other end of the seventh metal pipe 207 and the other end of the eighth metal pipe 208 are connected via a fourth pipe connection pipe 684.

Further, one end of a first outflow connection pipe 657 is connected to the middle of the inner connection pipe 653, and one end of a second outflow connection pipe 658 is connected to the middle of the outer connection pipe 656. The first on-off valve 63 is interposed in the middle of the first outflow connection pipe 657, and the second on-off valve 64 is interposed in the middle of the second outflow connection pipe 658. Then, the other end of the first outflow connection pipe 657 and the other end of the second outflow connection pipe 658 join each other and are connected to one end of an outflow connection pipe 659.

When cooling the lithium battery 50 in the storage case 1 by the heat exchange circuit 60 having the above configuration, the pump 61 is driven in a state where each valve is controlled such that the first port 621 and the second port 622 of the three-way valve 62 communicate with each other, the first on-off valve 63 is closed, and the second on-off valve 64 is opened. Then, a low temperature heat exchange medium is introduced into the pump 61 from the inflow connection pipe 651 via the suction port 611. In addition, the low temperature heat exchange medium may be generated by cooling the heat exchange medium, for example, by a low pressure side (low temperature portion) in a radiator or a heat pump system mounted in the vehicle.

The low temperature heat exchange medium introduced into the pump 61 is ejected from the ejection port 612. The heat exchange medium ejected from the pump 61 reaches the three-way valve 62 via the ejection connection pipe 652, and flows from the second port 622 of the three-way valve 62 to the inner connection pipe 653. Furthermore, the heat exchange medium flows from the inner connection pipe 653 to the first inner connection pipe 661, the second inner connection pipe 662, the third inner connection pipe 663, and the fourth inner connection pipe 664 via the inner branch connection pipes 654 and 655. Then, the heat exchange medium flows from these pipes to the second metal pipe 202, the third metal pipe 203, the sixth metal pipe 206, and the seventh metal pipe 207. Here, the second metal pipe 202 and the third metal pipe 203 are provided below the vicinity of the central portion of each lithium battery 50 constituting the first battery unit 50A, and the sixth metal pipe 206 and the seventh metal pipe 203 are provided below the vicinity of the central portion of each lithium battery 50 constituting the second battery unit 50B. Therefore, as the low temperature heat exchange medium flows through the metal pipes 202, 203, 206 and 207, the central portion of each lithium battery 50 is cooled.

The heat exchange medium which has flowed through the second metal pipe 202 flows to the first metal pipe 201 via the first pipe connection pipe 681, the heat exchange medium which has flowed through the third metal pipe 203 flows to the fourth metal pipe 204 via the second pipe connection pipe 682, the heat exchange medium which has flowed through the sixth metal pipe 206 flows to the fifth metal pipe 205 via the third pipe connection pipe 683, and the heat exchange medium which has flowed through the seventh metal pipe 207 flows to the eighth metal pipe 208 via the fourth pipe connection pipe 684. Here, the first metal pipe 201 and the fourth metal pipe 204 are provided below the vicinity of either end portion of each lithium battery 50 constituting the first battery unit 50A, and the fifth metal pipe 205 and the eighth metal pipe 208 are provided below the vicinity of either end portion of each lithium battery 50 constituting the second battery unit 50B. Therefore, as the low temperature heat exchange medium flows through the metal pipes 201, 204, 205 and 208, either end portion, i.e., the outer portion of each lithium battery 50 is cooled.

The heat exchange medium which has flowed through the first metal pipe 201 is introduced into the first outer connection pipe 671, the heat exchange medium which has flowed through the fourth metal pipe 204 is introduced into the second outer connection pipe 672, the heat exchange medium which has flowed through the fifth metal pipe 205 is introduced into the third outer connection pipe 673, and the heat exchange medium which has flowed through the eighth metal pipe 208 is introduced into the fourth outer connection pipe 674. Thereafter, the heat exchange medium in each of the connection pipes 671 to 674 merges and flows to the outer connection pipe 656, further reaches the outflow connection pipe 659 via the second outflow connection pipe 658, and flows to the outside from the outflow connection pipe 659.

Further, when heating the lithium battery 50 in the storage case 1 by the heat exchange circuit 60 having the above configuration, the pump 61 is driven in a state where each valve is controlled such that the first port 621 and the third port 623 of the three-way valve 62 communicate with each other, the first on-off valve 63 is opened, and the second on-off valve 64 is closed. Then, a high temperature heat exchange medium is introduced into the pump 61 from the inflow connection pipe 651 via the suction port 611. In addition, the high temperature heat exchange medium may be generated by heating, for example, the heat exchange medium with an electric heater.

The high temperature heat exchange medium introduced into the pump 61 is ejected from the ejection port 612. The heat exchange medium ejected from the pump 61 reaches the three-way valve 62 via the ejection connection pipe 652, and flows from the third port 623 of the three-way valve 62 to the outer connection pipe 656. Furthermore, the heat exchange medium flows from the outer connection pipe 656 to the first outer connection pipe 671, the second outer connection pipe 672, the third outer connection pipe 673, and the fourth outer connection pipe 674. Then, the heat exchange medium flows from these connection pipes to the first metal pipe 201, the fourth metal pipe 204, the fifth metal pipe 205, and the eighth metal pipe 208. As the low temperature heat exchange medium flows through the metal pipes 201, 204, 205 and 208, the outer portion of each lithium battery 50 is heated.

The heat exchange medium which has flowed through the first metal pipe 201 flows to the second metal pipe 202 via the first pipe connection pipe 681, the heat exchange medium which has flowed through the fourth metal pipe 204 flows to the third metal pipe 203 via the second pipe connection pipe 682, the heat exchange medium which has flowed through the fifth metal pipe 205 flows to the sixth metal pipe 206 via the third pipe connection pipe 683, and the heat exchange medium which has flowed through the eighth metal pipe 208 flows to the seventh metal pipe 207 via the fourth pipe connection pipe 684. As the heat exchange medium flows through these metal pipes 202, 203, 206 and 207, the central portion of each lithium battery 50 is heated.

The heat exchange medium which has flowed through the second metal pipe 202 is introduced into the first inner connection pipe 661, the heat exchange medium which has flowed through the third metal pipe 203 is introduced into the second inner connection pipe 662, the heat exchange medium which has flowed through the sixth metal pipe 206 is introduced into the third inner connection pipe 663, and the heat exchange medium which has flowed through the seventh metal pipe 207 is introduced into the fourth inner connection pipe 664. The heat exchange medium introduced into these connection pipes merges at the inside connection pipe 653 via the inside branch connection pipes 654 and 655, further reaches the outflow connection pipe 659 via the first outflow connection pipe 657, and flows to the outside from the outflow connection pipe 659.

As described above, when cooling the lithium battery 50, the heat exchange medium flows from the metal pipes 202, 203, 206 and 207 provided below the portion where the central portion of the lithium battery 50 is mounted toward the metal pipes 201, 204, 205 and 208 provided below the portion where the outer portion of the lithium battery 50 is mounted. Therefore, first, the central portion of the lithium battery 50 is cooled by the low temperature heat exchange medium, and thereafter, the outer portion of the lithium battery 50 is cooled by the heat exchange medium. Meanwhile, when heating the lithium battery 50, the heat exchange medium flows from the metal pipes 201, 204, 205 and 208 provided below the portion where the outer portion of the lithium battery 50 is mounted toward the metal pipes 202, 203, 206 and 207 provided below the portion where the central portion of the lithium battery 50 is mounted. Therefore, first, the outer portion of the lithium battery 50 is heated by the high temperature heat exchange medium, and thereafter, the central portion of the lithium battery 50 is heated by the heat exchange medium.

A case where the lithium battery 50 is cooled is a case where the lithium battery 50 generates heat. In this case, the outer portion of the lithium battery 50 easily emits heat to the outside, but the central portion of the lithium battery 50 tends to collect heat. Accordingly, as described above, by first cooling the central portion of the lithium battery 50 with a cold heat exchange medium and then cooling the outer portion of the lithium battery 50 with the heat exchange medium which has been slightly warmed by cooling the central portion of the lithium battery 50, heat exchange in the central portion having a higher temperature may be promoted. As a result, the lithium battery 50 may be cooled such that the temperature of the lithium battery 50 becomes uniform as a whole.

Further, the lithium battery 50 is heated, for example, when the outside air temperature is extremely low. In this case, the outer portion of the lithium battery 50 is particularly cooled, and the central portion of the lithium battery 50 is not cooled as compared with the outer portion. Accordingly, as described above, by first heating the outer portion of the lithium battery 50 with a high temperature heat exchange medium and then heating the central portion of the lithium battery 50 with the heat exchange medium which has been slightly cooled by heating the outer portion of the lithium battery 50, heat exchange in the outer portion having a lower temperature may be promoted. As a result, the lithium battery 50 may be heated such that the temperature of the lithium battery 50 becomes uniform as a whole.

Second Embodiment

Figure 7:
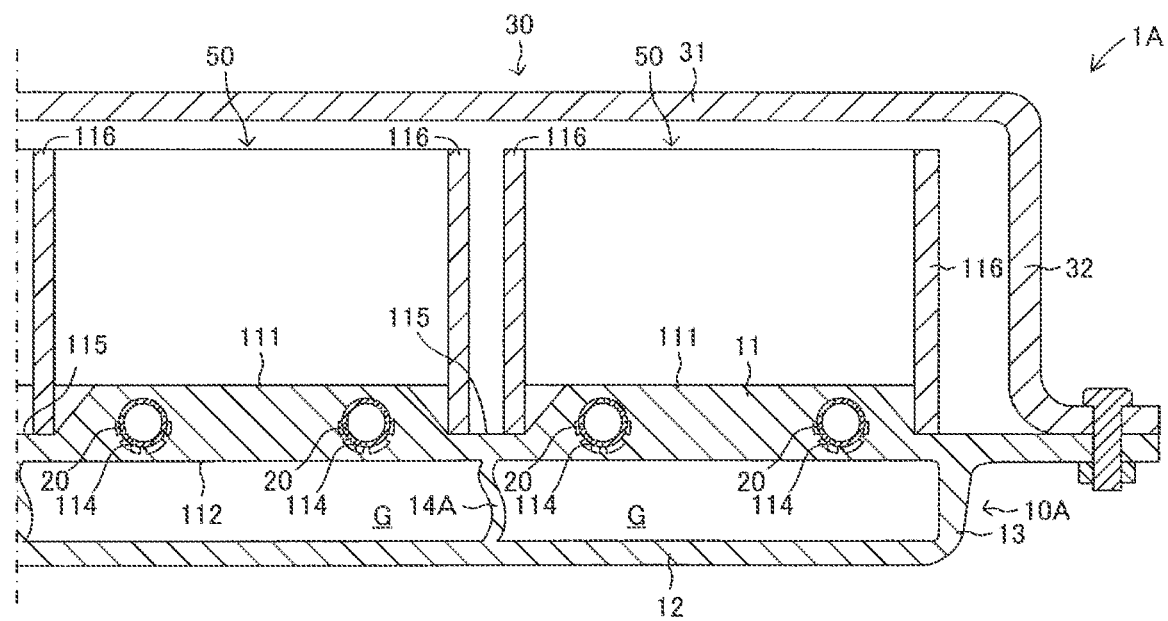
FIG. 7 is a schematic cross-sectional view partially illustrating an example of a battery storage case according to a second embodiment.

FIG. 7 is a schematic cross-sectional view partially illustrating an example of a storage case for a lithium battery according to a second embodiment. As illustrated in FIG. 7, the storage case 1A according to the present embodiment includes a temperature adjustment plate 10A, the plurality of metal pipes 20, and the upper lid 30. A configuration of the upper lid 30 is the same as the configuration of the upper lid 30 illustrated in the first embodiment.

Further, the temperature adjustment plate 10A according to the present embodiment is basically configured in the same manner as the temperature adjustment plate 10 illustrated in the first embodiment, and includes the upper wall portion 11 on which the lithium battery 50 is mounted, the lower wall portion 12 disposed below and spaced apart from the upper wall portion 11 so as to face the upper wall portion 11, and the connection wall portion 13 connecting the upper wall portion 11 and the lower wall portion 12 to each other, and is integrally formed of an aluminum alloy. Then, a plurality of flow path forming holes 114 for forming a flow path through which a heat exchange medium for adjusting the temperature of the lithium battery 50 flows are formed in parallel in the upper wall portion 11 so as to penetrate both side surfaces of the upper wall portion 11, and the metal pipes 20 formed of an aluminum alloy or copper are inserted into the flow path forming holes 114. The heat exchange medium flows in the metal pipe 20. The shape of the flow path forming hole 114 and the shape and material of the metal pipe 20 are the same as the shape of the flow path forming hole 114 and the shape and material of the metal pipe 20 illustrated in the first embodiment.

Further, also in this example, similarly to the first embodiment, the lithium battery 50 mounted on the upper wall portion 11 is configured with a cell stack in which a plurality of cells are stacked. However, unlike the first embodiment, the stacking direction of each cell is parallel to the axial direction of the flow path forming holes 114. That is, the respective cells constituting the lithium battery 50 are stacked along the axial direction of the flow path forming hole 114.

On the upper surface of the upper wall portion 11, the mounting surface 111 on which the lithium battery 50 is mounted and a plurality of partition grooves 115 formed so as to be depressed downward from the mounting surface 111 are formed. The partition grooves 115 extend in the axial direction of the flow path forming holes 114, and the mounting surface 111 is partitioned into a plurality of mounting areas by the partition grooves 115. The length in the transverse direction of each mounting area partitioned by the partition grooves 115, i.e., the length of the mounting area in the direction perpendicular to the direction in which the partition grooves 115 extend is substantially the same as the width of each cell constituting the lithium battery 50. Then, the lithium battery 50 is mounted on each of the mounting areas partitioned by the partition grooves 115. At this time, the lithium battery 50 is mounted on the mounting surface 111 such that the width direction of each cell of the lithium battery 50 matches the transverse direction of the mounting area and the stacking direction of each cell matches the direction in which the partition grooves 115 extend.

A fixing stay 116 is provided in each partition groove 115. The fixing stay 116 is formed in a flat plate shape, stands upright from the bottom surface of the partition groove 115, and extends in the direction perpendicular to the paper surface of FIG. 7. The fixing stay 116 fixes either end of the lithium battery 50 on the mounting area partitioned by the partition groove 115.

Further, in the present embodiment, the lower surface 112 of the upper wall portion 11 is formed as a flat surface parallel to the horizontal direction, and the protruding portions 113 is as in the first embodiment are not formed on the lower surface 112. Therefore, the volume of the air gap G formed between the upper wall portion 11 and the lower wall portion 12 therebelow may be increased. Accordingly, the protection of the upper wall portion 11 and the metal pipe 20 inside the upper wall portion 11 from a pressure from below may be enhanced. Further, since the air gap G functions as a heat insulation space, by increasing the air gap G, it is possible to further reduce the amount of downward transfer of the heat of the heat exchange medium flowing through the metal pipe 20 in the upper wall portion 11. The heat of the heat exchange medium may be more efficiently transferred to the lithium battery 50 on the upper wall portion 11.

Further, a reinforcing rib 14A stands upright from the upper surface of the lower wall portion 12. The upper end of the reinforcing rib 14A is connected to the lower surface 112 of the upper wall portion 11 at a position directly below a portion where the partition groove 115 is formed. Further, the reinforcing rib 14A is formed so as to have an S-shaped cross-section. Therefore, when an impact is applied to the lower wall portion 12 by a pressure from below, the reinforcing rib 14A having the S-shaped cross section is gradually deformed to absorb the impact. Thus, the impact transmitted to the upper wall portion 11 and the lithium battery 50 thereon may be reduced. Further, the reinforcing rib 14A is connected to a position directly below the partition groove 115 in the upper wall portion 11, and only the fixing stay 16 is disposed directly above the connection position without the lithium battery 50. Therefore, the impact from below is not directly transmitted to the lithium battery 50. Accordingly, damage to the lithium battery 50 due to the impact may be more effectively prevented. Further, according to this configuration, the flow path forming hole 114 may be formed in the upper wall portion 11 of the temperature adjustment plate 10A at a position close to the bottom surface of the lithium battery 50 mounted on the upper wall portion 11. Therefore, the heat exchange efficiency between the heat exchange medium flowing through the metal pipe 20 in the flow path forming hole 114 and the lithium battery 50 may be further enhanced.

Figure 8:
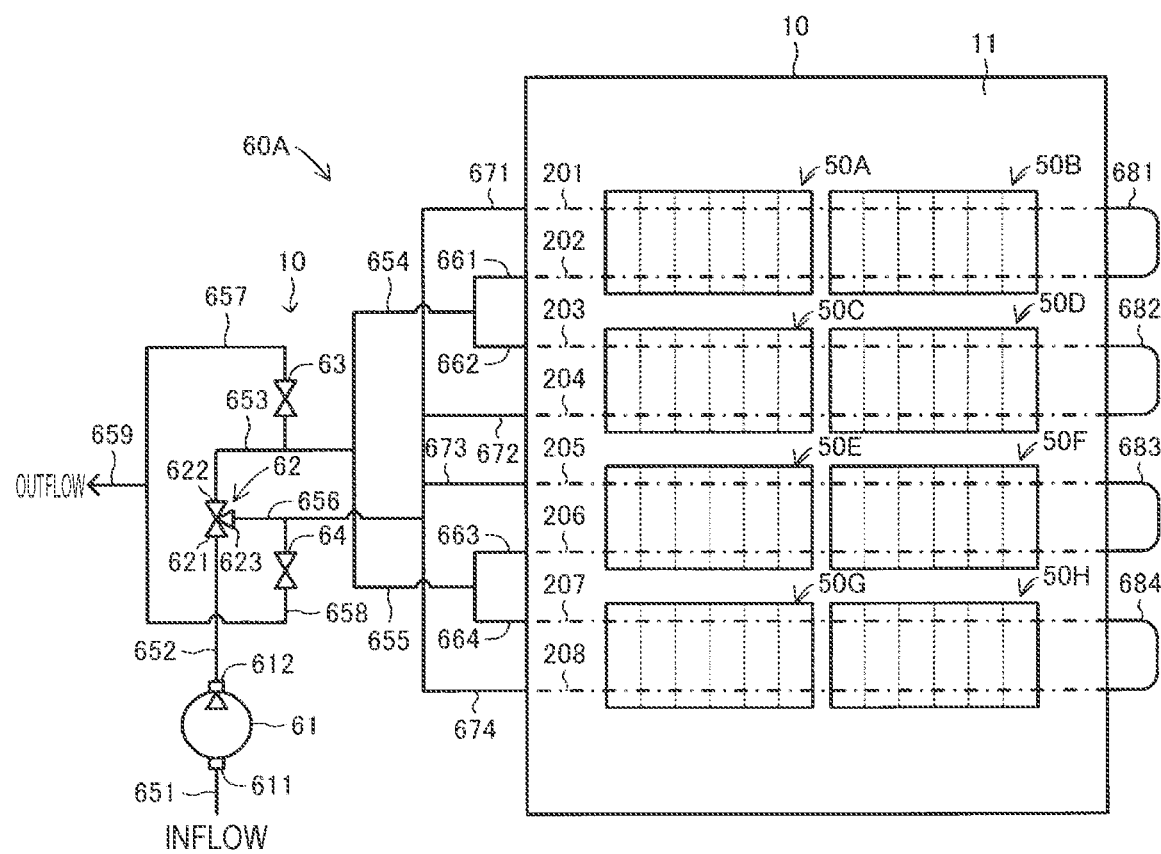
FIG. 8 is a view illustrating a configuration example of a heat exchange circuit using a plurality of metal pipes provided in a temperature adjustment plate according to a second embodiment.

FIG. 8 is a view illustrating a configuration example of a heat exchange circuit 60A using the plurality of metal pipes 20 (201, 202, 203, 204, 205, 206, 207 and 208) provided in the temperature adjustment plate 10A according to the second embodiment. The configuration of the heat exchange circuit 60A is the same as the heat exchange circuit 60 illustrated in FIG. 6 described in the first embodiment. Therefore, among components of the heat exchange circuit 60A, the same components as those of the heat exchange circuit 60 will be denoted by the same reference numerals. However, the arrangement of the lithium battery 50 mounted on the temperature adjustment plate 10A is different from that of the first embodiment.

As illustrated in FIG. 8, a plurality of lithium batteries 50A, 50B, 50C, 50D, 50E, 50F, 50G and 50H are mounted on the upper wall portion 11 of the temperature adjustment plate 10. In this case, above a portion of the upper wall portion 11 into which the first metal pipe 201 and the second metal pipe 202 are inserted, two lithium batteries 50A and 50B are mounted side by side in the direction in which both the metal pipes 201 and 202 extend. Above a portion of the upper wall portion 11 into which the third metal pipe 203 and the fourth metal pipe 204 are inserted, two lithium batteries 50C and 50D are mounted side by side in the direction in which both the metal pipes 203 and 204 extend. Above a portion of the upper wall portion 11 into which the fifth metal pipe 205 and the sixth metal pipe 206 are inserted, two lithium batteries 50E and 50F are mounted side by side in the direction in which both the metal pipes 205 and 206 extend. Above a portion of the upper wall portion 11 into which the seventh metal pipe 207 and the eighth metal pipe 208 are inserted, two lithium batteries 50G and 50H are mounted side by side in the direction in which both the metal pipes 207 and 208 extend. Further, a method of stacking a plurality of cells constituting each lithium battery 50 matches the direction in which each metal pipe extends. Even when the heat exchange circuit 60A is formed as described above, the temperature of each lithium battery 50 may be adjusted by flowing the heat exchange medium into the heat exchange circuit 60A.

(Modification)

Figure 9:
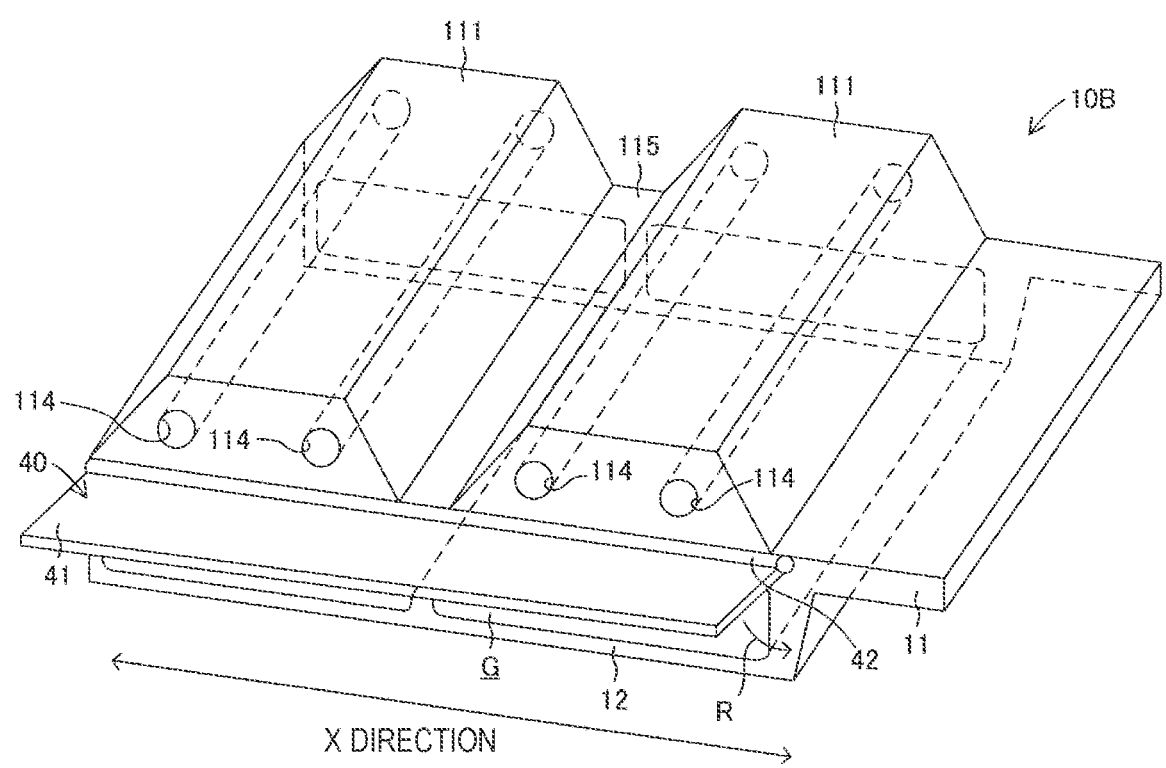
FIG. 9 is a schematic view illustrating a temperature adjustment plate according to a modification.

FIG. 9 is a schematic view illustrating a temperature adjustment plate 10B according to a modification. The temperature adjustment plate 10B according to this example includes a shutter mechanism 40. The other configuration is the same as the configuration of the temperature adjustment plate 10A described in the second embodiment.

As illustrated in FIG. 9, the shutter mechanism 40 is provided on one side end surface of the upper wall portion 11 of the temperature adjustment plate 10B, specifically, one of both side end surfaces forming an opening edge of the air gap G. The shutter mechanism 40 includes an opening and closing door 41, a rotating shaft 42, and an actuator (not illustrated).

The rotating shaft 42 extends in the X direction in FIG. 9, i.e., the direction (horizontal direction) parallel to the mounting surface 111 along the side end surface of the upper wall portion 11 of the temperature adjustment plate 10B. The rotating shaft 42 is configured so as to be rotatable around the axis thereof in one direction and in the opposite direction by an operation of the actuator. The opening and closing door 41 is coupled to the rotating shaft 42. The opening and closing door 41 is formed in a long plate shape, and one long side thereof is connected to the rotating shaft 42 along the axial direction of the rotating shaft 42. Further, the other long side of the opening and closing door 41 is a free end. Then, the opening and closing door 41 is configured so as to swing about the rotating shaft 42 in the direction R in FIG. 9 and in the opposite direction according to the rotation of the rotation shaft 42 around the axis. When the opening and closing door 41 swings in the R direction from the position illustrated in FIG. 9 by an operation of the actuator, the opening and closing door 41 swings to a closing position where it closes the air gap G formed between the upper wall portion 11 and the lower wall portion 12 of the temperature adjustment plate 10B. When the opening and closing door 41 reaches the closing position, the operation of the actuator stops. Therefore, the opening and closing door 41 is positioned at the closing position. Further, when the opening and closing door 41 rotates from the closing position in the direction opposite to the R direction in FIG. 9 by an operation of the actuator, the opening and closing door 41 swings to a predetermined opening position where the opening of the air gap G is opened. When the opening and closing door 41 reaches the opening position, the operation of the actuator stops. Therefore, the opening and closing door 41 is positioned at the opening position.

When cooling the lithium battery 50 mounted on the temperature adjustment plate 10B, the opening and closing door 41 is positioned at the opening position. Thus, air is introduced into the air gap G from the opening of the air gap G. The lithium battery 50 on the temperature adjustment plate 10B is cooled by the introduced air via the temperature adjustment plate 10B. That is, the lithium battery 50 is air-cooled. Accordingly, through cooling (water cooling) achieved by flowing the heat exchange medium into the metal pipe 20 inserted into the flow path forming hole 114 formed in the upper wall portion 11 of the temperature adjustment plate 10B as well as air cooling achieved by the air introduced into the gap G, the lithium battery 50 on the temperature adjustment plate 10B may be quickly cooled.

When heating the lithium battery 50 mounted on the temperature adjustment plate 10B, the opening and closing door 41 is positioned at the closing position. Thus, the introduction of air into the air gap G is prevented. Therefore, the temperature adjustment plate 10B and the lithium battery 50 on the temperature adjustment plate 10B are prevented from being cooled by the cold air introduced into the air gap G. That is, the temperature adjustment plate 10B and the lithium battery 50 are kept warm. Accordingly, the lithium battery 50 on the temperature adjustment plate 10B may be quickly heated by the heat of the heat exchange medium in the metal pipe 20 inserted into the flow path forming hole 114 formed in the upper wall portion 11 of the temperature adjustment plate 10B.

As described above, the embodiments and the modification disclosed here have been described, but this disclosure should not be limited to the embodiments and the modification. For example, in the above embodiments, the example in which the metal pipe 20 is inserted into the flow path forming hole 114 formed in the upper wall portion 11 of the temperature adjustment plates 10, 10A or 10B and the heat exchange medium flows through the metal pipe 20 has been described, but the heat exchange medium may directly flow into the flow path forming hole 114.

Further, a notch may be formed in the flow path forming hole 114 to facilitate an expansion in diameter when the diameter of the raw pipe 20A of the metal pipe 20 is increased using the diameter expanding jig T within the flow path forming hole 114. Further, a mechanism for suppressing the movement of the metal pipe inserted into the flow path forming hole 114 or a mechanism for preventing the metal pipe from dropping out of the flow path forming hole 114 may be provided. Further, an uneven shape may be formed on the inner peripheral surface of the metal pipe 20. For example, a plurality of grooves may be formed on the inner peripheral surface of the metal pipe 20. According to this, the heat transfer area is increased by increasing the surface area of the inner peripheral surface of the metal pipe 20, so that the heat exchange efficiency between the lithium battery 50 and the heat exchange medium in the metal pipe 20 may be enhanced. Further, a heat insulation material may be wound around each connection pipe constituting the heat exchange circuit 60. According to this, heat loss due to heat exchange between the heat exchange medium and the connection pipe may be reduced. Thus, this disclosure may be modified without departing from the spirit thereof.

An aspect of this disclosure provides a battery storage case (1) including a temperature adjustment plate (10, 10A, 10B) having an upper wall portion (11) on which a battery (50) is mounted, a lower wall portion (12) disposed below and spaced apart from the upper wall portion so as to face the upper wall portion, and a connection wall portion (13) connecting the upper wall portion and the lower wall portion to each other, the temperature adjustment plate being integrally formed of an aluminum alloy, and an upper lid (30) connected to the temperature adjustment plate so as to cover the battery mounted on the upper wall portion, in which the upper wall portion is formed with a flow path forming hole (114) for forming a flow path through which a heat exchange medium for adjusting a temperature of the battery flows.

According to the temperature adjustment plate included in the storage case according to the aspect of this disclosure, a double bottom structure is realized by the upper wall portion and the lower wall portion which are vertically spaced apart from each other so as to face each other. Then, the upper wall portion is formed with a flow path forming hole through which the heat exchange medium (cooling water) for adjusting the temperature of the battery flows. By performing heat exchange between the heat exchange medium flowing in the flow path forming hole and the battery mounted on the upper wall portion, the temperature of the battery mounted on the upper wall portion is efficiently adjusted. Further, even if a pressure is applied from below to a vehicle having the storage case disposed at the bottom and the lower wall portion of the temperature adjustment plate is damaged, the battery mounted on the upper wall portion is protected. Further, since there is no flow path through which the heat exchange medium flows between the upper wall portion and the lower wall portion, as compared with a case where the pipe (heat exchange pipe) for flowing the heat exchange medium exists between the upper wall portion and the lower wall portion as in Reference 2, the flow path for flowing the heat exchange medium may be more reliably protected. Furthermore, even when the flow path forming hole in the upper wall portion is damaged by the above-described pressure applied from below, the heat exchange medium such as cooling water flowing in the flow path forming hole will leak downward. Therefore, the heat exchange medium may be effectively prevented from infiltrating into the battery mounted on the upper wall portion.

Further, the temperature adjustment plate according to the aspect of this disclosure is integrally formed of an aluminum alloy, i.e., formed by one member. Therefore, the double bottom structure may be formed by one member, so that the manufacturing cost may be reduced as compared with a conventional storage case in which the double bottom structure is formed by a plurality of members. As described above, according to the aspect of this disclosure, it is possible to provide a battery storage case which may be manufactured at lower costs and which may effectively prevent the infiltration of water into the battery.

The battery storage case according to the aspect of this disclosure may include a metal pipe (20) inserted into the flow path forming hole and configured to allow the heat exchange medium (cooling water) to flow therethrough. According to this configuration, by flowing the heat exchange medium through the metal pipe inserted into the flow path forming hole instead of flowing the heat exchange medium directly into the flow path forming hole, for example, even if the upper wall portion is damaged by the above-described pressure applied from below, the heat exchange medium may be prevented from leaking out as long as the pipe is not damaged. Further, by forming the temperature adjustment plate and the pipe through which the heat exchange medium flows by different members, materials suitable for the characteristics required for the respective components may be selected.

In this case, the metal pipe may be fixed in the flow path forming hole so as to come in contact with an upper region of an inner peripheral surface of the flow path forming hole and have a gap (S) formed between the pipe and a lower region of the inner peripheral surface. According to this, the heat of the heat exchange medium flowing in the pipe may be efficiently transferred to an upper portion of the upper wall portion. Therefore, the temperature of the battery mounted on the upper wall portion may be efficiently adjusted.

Furthermore, in this case, a plurality of protrusions (115) may be formed in the lower region of the inner peripheral surface of the flow path forming hole to be spaced apart from each other in a circumferential direction, and the pipe may be fixed in the flow path forming hole by pressing an outer peripheral surface of the pipe against the plurality of protrusions. According to this, the plurality of protrusions formed in the lower region of the inner peripheral surface of the flow path forming hole are pressed against the pipe, so that the pipe may be firmly fixed to the flow path forming hole without performing welding, and the outer peripheral surface of the pipe may be brought into contact with the upper region of the inner peripheral surface of the flow path forming hole over a wide range. Further, since the plurality of protrusions are spaced apart from each other in the circumferential direction of the flow path forming hole, when the pipe is fixed to the flow path forming hole, the gap may be formed by a portion where the protrusions are not formed of the lower region of the inner peripheral surface of the flow path forming hole. This gap functions as a heat insulation space, so that the heat of the heat exchange medium flowing in the pipe may be effectively prevented from escaping downward.

As a material of the pipe, an aluminum alloy, copper, or plated iron may be used. In particular, an aluminum alloy or copper may be preferably used. More preferably, the pipe may be formed of an aluminum alloy. According to this, since both the temperature adjustment plate and the pipe are formed of an aluminum alloy, the difference in the coefficient of thermal expansion between the two may be almost eliminated. Therefore, it is possible to effectively prevent relative movement of the pipe in the flow path forming hole of the temperature adjustment plate due to the difference in the coefficient of thermal expansion, thereby preventing a reduction in the fixing force of the pipe in the flow path forming hole.

When both the temperature adjustment plate and the pipe are formed of an aluminum alloy, the temperature adjustment plate may be formed of a 6000 series or 7000 series aluminum alloy, and the pipe may be formed of a 3000 series aluminum alloy. According to this, by forming the temperature adjustment plate of a 6000 series or 7000 series aluminum alloy having a high strength, the strength of the temperature adjustment plate may be increased, and by forming the pipe of a 3000 series aluminum alloy having high corrosion resistance, corrosion of the pipe by the heat exchange medium may be effectively prevented.

Further, in the temperature adjustment plate, a rib (14) connecting the upper wall portion and the lower wall portion to each other may be formed in a space between the upper wall portion and the lower wall portion. According to this, the rib increases the strength of the temperature adjustment plate and effectively prevents deformation of the temperature adjustment plate.

Further, a plurality of the flow path forming holes may be formed in parallel in the upper wall portion of the temperature adjustment plate, and a plurality of the pipes may be inserted into the plurality of the flow path forming holes, respectively. In this case, a heat exchange circuit through which the heat exchange medium flows may be configured by interconnecting the pipe inserted into one flow path forming hole and the pipe inserted into another flow path forming hole. According to this, the heat exchange circuit (e.g., a cooling water circuit) may be formed over a wide range of the upper wall portion of the temperature adjustment plate.

Further, when cooling the battery, the heat exchange circuit may be configured such that the heat exchange medium flows from the pipe provided in a portion of the upper wall portion of the temperature adjustment plate where a central portion of the battery is mounted toward the pipe provided in a portion where an outer portion of the battery is mounted. Further, when heating the battery, the heat exchange circuit may be configured such that the heat exchange medium flows from the pipe provided in the portion of the upper wall portion of the temperature adjustment plate where the outer portion of the battery is mounted toward the pipe provided in the portion where the central portion of the battery is mounted. According to this, the temperature of the battery may be adjusted so as to become uniform as a whole.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A battery storage case comprising:
   a temperature adjustment plate having an upper wall portion on which a battery is mounted, a lower wall portion disposed below and spaced apart from the upper wall portion so as to face the upper wall portion, and a connection wall portion connecting the upper wall portion and the lower wall portion to each other, the temperature adjustment plate being integrally formed of an aluminum alloy; and
   an upper lid connected to the temperature adjustment plate so as to cover the battery mounted on the upper wall portion,
   wherein the upper wall portion is formed with a flow path forming hole for forming a flow path through which a heat exchange medium for adjusting a temperature of the battery flows, and wherein a pipe is fixed in the flow path forming hole so as to come in contact with an upper region of an inner peripheral surface of the flow path forming hole and have a gap formed between the pipe and a lower region of the inner peripheral surface of the flow path forming hole.

2. The battery storage case according to claim 1, wherein the pipe is a metal pipe inserted into the flow path forming hole and configured to allow the heat exchange medium to flow therethrough.

3. The battery storage case according to claim 1, wherein a plurality of protrusions are formed in the lower region of the inner peripheral surface of the flow path forming hole to be spaced apart from each other in a circumferential direction, and the plurality of protrusions extend through the gap and are in contact with an outer peripheral surface of the pipe.

4. The battery storage case according to claims 2, wherein the pipe is formed of an aluminum alloy.

5. The battery storage case according to claim 4, wherein the temperature adjustment plate is formed of a 6000 series or 7000 series aluminum alloy, and the pipe is formed of a 3000 series aluminum alloy.

6. The battery storage case according to claim 2, wherein a plurality of the flow path forming holes are formed in parallel in the upper wall portion, and a plurality of the pipes are inserted into the plurality of the flow path forming holes, respectively.

\* \* \* \* \*